No. 717,338. Patented Dec. 30, 1902.
J. A. BURNS.
MONORAIL ROLLING STOCK.
(Application filed Apr. 29, 1902.)
(No Model.) 3 Sheets—Sheet 3.
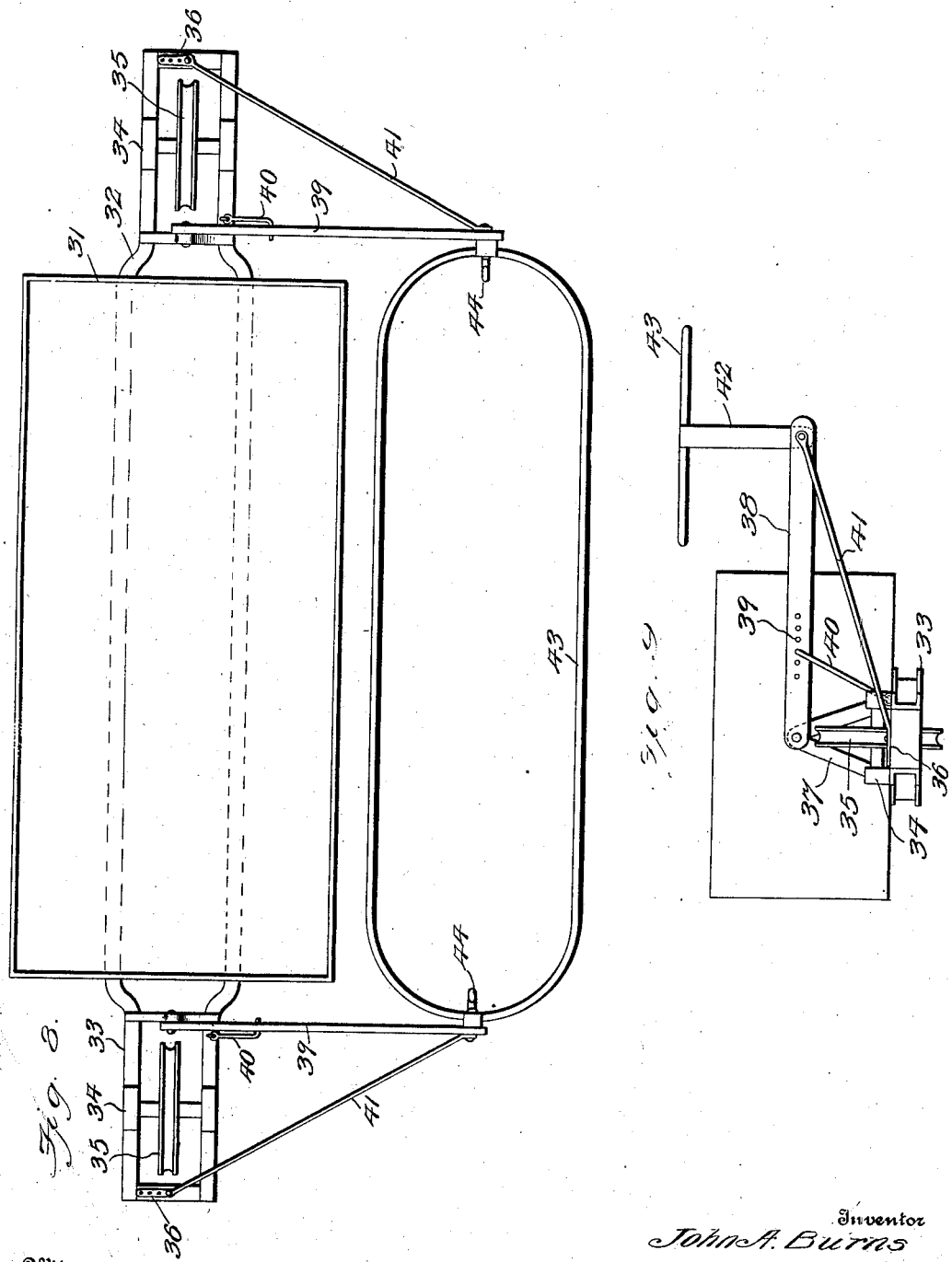
Witnesses
Inventor
John A. Burns
By Victor J. Evans
Attorney

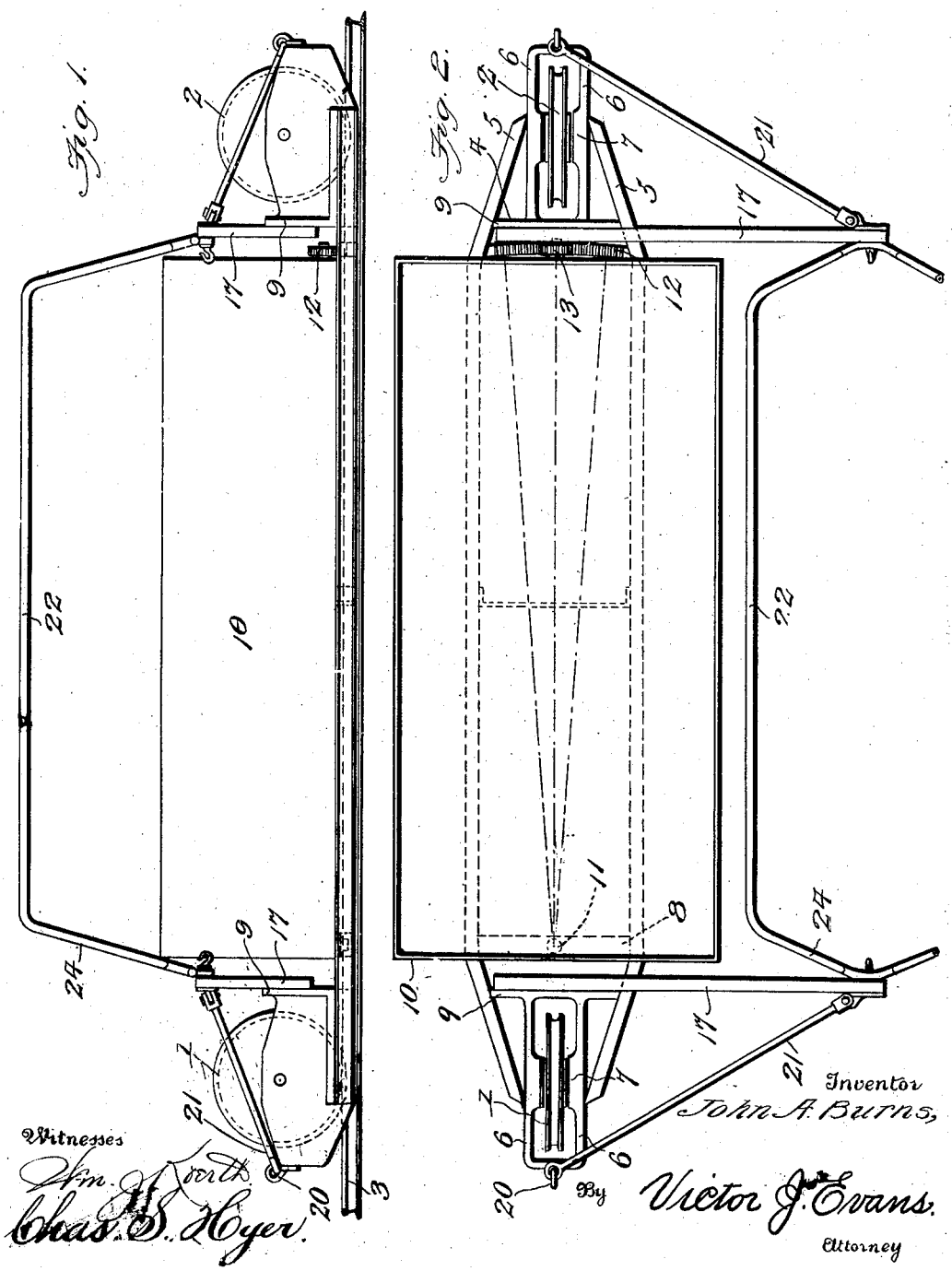

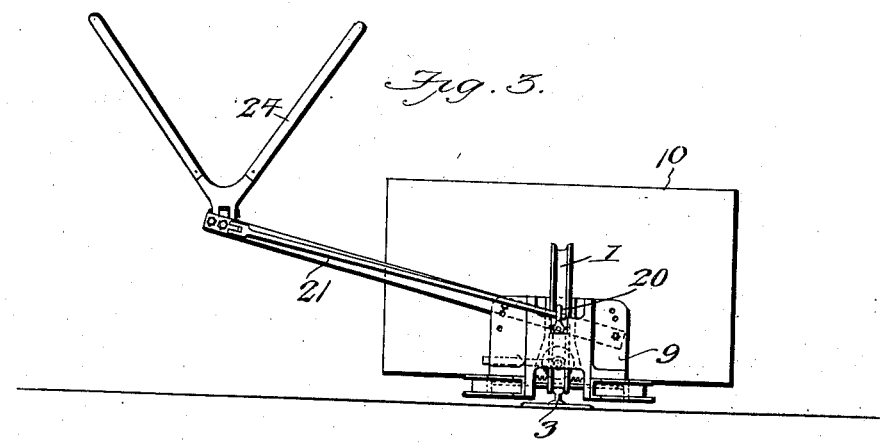
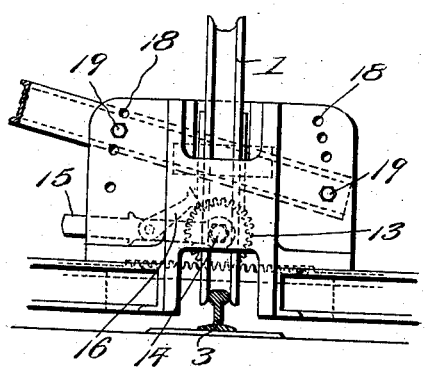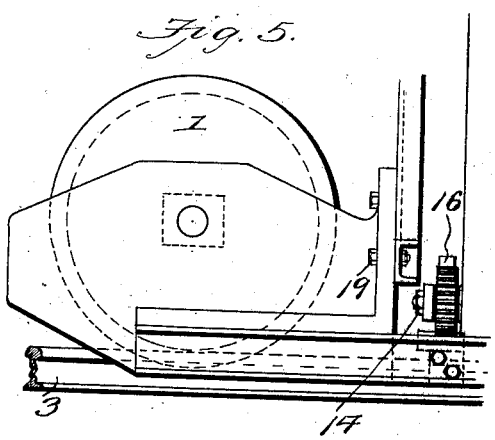
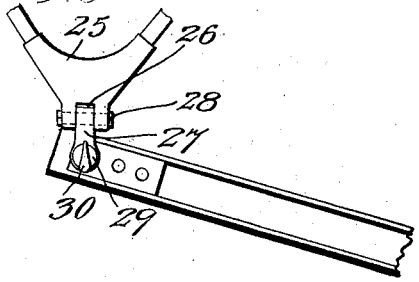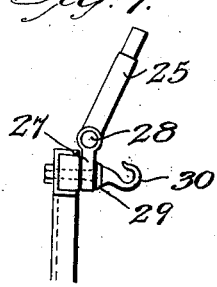

UNITED STATES PATENT OFFICE.

JOHN ALEXANDER BURNS, OF NEW YORK, N. Y.

MONORAIL ROLLING-STOCK.

SPECIFICATION forming part of Letters Patent No. 717,338, dated December 30, 1902.

Application filed April 29, 1902. Serial No. 105,216. (No model.)

*To all whom it may concern:*

Be it known that I, JOHN ALEXANDER BURNS, a subject of the King of Great Britain, residing at New York, in the county of New York and State of New York, have invented new and useful Improvements in Monorail Rolling-Stock, of which the following is a specification.

This invention has reference to single-line or monorail railways in which the vehicles are provided with centrally-alined wheels engaging a single track-rail disposed on the ground-surface; and the primary object of the present invention is to provide simple and effective means for moving the body or containing device of the vehicle laterally to balance the load to enable the moving power to be brought nearer to the track-rail and in a more effective position and also to relieve the said power, whether it be manual or animal, of a large proportion of the strain which would be present if the body or containing receptacle of the vehicle was immovable.

A further object of the invention is to provide the car-body or containing-receptacle with simple means for attachment of a draft-animal or application of manual power which is so constructed and operative as to counteract any tendency toward upward or downward movement of the said means and also to adjust the latter proportionately to the size of the animal, the weight of the load, and the position of the body in relation to its supporting frame or truck, so as to equalize the weight resistance of the load relatively to the weight of the draft-animal or the manual operating-power employed to propel the vehicle.

The invention, broadly stated, consists in supporting means having centrally-alined wheels to engage a single track-rail, a body or containing device pivotally mounted at one end on the said means and adjustable laterally at its opposite extremity to balance the load, and mechanism for effecting the adjustment.

The invention further consists in a monorail vehicle having means for laterally adjusting the same to balance the load and a vertically-adjustable steadying attachment for connection of a draft-animal or the application of manual propelling-power.

The invention further consists in the construction and arrangement of the several parts in detail, which will be more fully hereinafter described and claimed.

In the drawings, Figure 1 is a side elevation of a monorail vehicle or car embodying the features of the invention. Fig. 2 is a top plan view of the same. Fig. 3 is an end elevation thereof. Fig. 4 is an enlarged front elevation of one of the end castings or supporting means for the wheel located at opposite ends of the vehicle or car and also illustrating means for adjusting the car-body and the steadying or propelling device. Fig. 5 is a side elevation of the devices shown by Fig. 4. Fig. 6 is a detail enlarged elevation of one of the steadying-arms and a portion of the steadying-frame. Fig. 7 is an edge elevation of the devices shown in Fig. 6. Fig. 8 is a top plan view of a modified form of the car. Fig. 9 is an end elevation of the car or vehicle shown by Fig. 8.

Similar numerals of reference are employed to indicate corresponding parts in the several views.

The truck consists of two grooved wheels 1 and 2, disposed in central alinement to engage a single track-rail 3 and having suspended from them the frame 4, which is made up of two lengths 5 of channel or other suitable form of iron firmly bolted at their terminals to end cast pieces or supports 6, having central bearings 7 to receive the axles of the wheels. The cast pieces or supports 6 are spaced apart from each other and have the wheels 1 and 2 mounted between them, or, in other words, it is proposed to construct these cast pieces or supports in such manner as to permit the car-wheels to be disposed therein. There are a number of methods of constructing the said pieces or supports 6, and they may be made in either one or two pieces; but for cheapness and expedition in manufacture it is preferred that they be cast in one piece, with an opening therethrough for the reception of the car-wheels. These cast pieces or supports may be replaced by wrought-iron work arranged to effectively bind the lengths 5 of the frame 4. The lengths 5 of the frame 4 are converged at their forward ends toward the cast pieces or supports 6; but for a greater portion of their extent they are disposed parallel and connected near one end by a transverse stay 8. Should the nature of the work to be done require it, the frame 4 may be carried on bogies. At each end of the frame is a vertically-disposed transversely-extending face member 9, which is held rigid with the frame and forms a part of the latter.

On the frame a body or containing-receptacle 10 is mounted and adjustably connected thereto by a pivot 11, attached thereto and engaging the transverse stay 8, the opposite end of the body or containing-receptacle being free to move over the frame. The end of the frame opposite to that having the transverse stay 8 is provided with a curved or segmental rack 12, held in fixed position and engaged by a pinion 13, mounted on the adjacent end of the body or receptacle 10. The pinion 13 freely rotates on a stub-shaft 14, secured to the body or receptacle 10 at the center, and also movably mounted on the said stub-shaft is an adjusting-lever 15, carrying a dog 16 to engage the teeth of the pinion 13 for rotating the latter in opposite directions to thereby shift the body or containing-receptacle over the frame as may be desired. The adjustment of the car-body or containing-receptacle is effected radially in relation to the pivot 11, and by this means it will be understood that the car-body or containing-receptacle can be brought to a balance when loaded.

For the purpose of steadying the car when in motion and also to provide means for moving it laterally-projecting arms 17 are employed, one at each end of the truck or receptacle. As clearly shown by Fig. 4, these arms are removably and adjustably secured at their inner extremities to the face plates or pieces 9, and for this purpose each plate or piece at the upper portion near opposite side edges is formed with a series of openings 18, disposed in curved alinement for the removable reception of bolts 19, passed therethrough and secured to the inner extremities of the arms 17. It will be seen that the arms 17 may be raised or lowered to accommodate different contingencies, such as a variation in height of draft-animals or varying elevations at which it is desired to apply manual power for propelling the car, as well as steadying the same in its movements. At the centers of the outer terminals of the cast pieces or supports 6 rings or hooks 20 are secured and have the inner terminals of brace-rods 21 attached thereto, the outer ends of said rods being detachably secured to the outer terminals of the arms 17. Between the arms 17 a steadying-frame 22 is detachably mounted and comprises opposite horizontally-disposed parallel rods or bars 23, elevated above the plane of the top of the body 10 and having their opposite extremities 24 directed downwardly and forwardly at an angle of inclination, the extremities 24 of the rods or bars at each end being converged toward a yoke 25, having a lower bifurcated extremity 26, in which the upper end of a connector 27 is held by a bolt 28, the said connector being movably mounted on a fulcrum-support 29, projecting inwardly from the outer end of the arm in each instance and radially with relation to the bolt 28. The fulcrum-supports 29 also carry hooks 30 to receive the singletree and harness of the draft-animal, the latter being thus connected at both ends of the frame with obvious advantages in propulsion, as well as steadying the movement of the load carried by the car-body. The arrangement of the steadying-frame set forth permits the draft-animal to be reversed or to travel in opposite directions, and the arms 17 may be projected laterally from either side of the car.

In Figs. 8 and 9 a modified form of the car is shown. This modified construction refers particularly to means for adjusting the arms connected to the steadying-frame. The car-body 31 is supported on a frame 32, substantially similar to the frame 4, heretofore described, and having connected end supports 33, spaced apart from each other and provided with central bearings 34 for the stub-shaft of grooved wheels 35, arranged in longitudinal alinement. The end supports 33 have end attaching members 36, and secured to the inner portions thereof adjacent to the body 31 are inverted-V-shaped uprights 37. The body 31 can be arranged to move laterally over the frame similar to the body 10, heretofore described, or it may be fixed on said frame, thus indicating that the steadying-frame, as heretofore described and which will be presently referred to, may be equally well employed with an adjustable body or with a fixed body. Adjustably extending outwardly from the uprights 37 are arms 38, having their inner ends pivotally attached to the fulcrums of said uprights and provided at an intermediate point with a series of alined apertures 39. Movably attached to one of the supports 33 at each end of the car is a hook 40 to engage any one of the series of apertures 39 in the adjacent arm 38 to hold the said arm at the angle of adjustment desired. The opposite support 33 may also be provided with a similar hook, so that the arm may be reversed and projected beneath the side of the car-body and similarly adjusted. Each end member 36 has the inner end of a brace-rod 41 adjustably connected thereto, the outer end of said rod being attached to the outer terminal of the arm, and thereby reinforce or strengthen the arm and at the same time distribute the draft-power. Movably rising from the outer ends of the arms 38 are uprights 42, which are pivotally held by the bolt or means for fastening the brace-rods 41 and are secured at their upper ends to an elliptical yoke or steadying-frame 43, in which a draft-animal is disposed and attached by means of hooks 44, extending inwardly from the pivotal points of the uprights 42. The upper end of one upright is detachably secured to one end of the yoke 43 for convenience in placing the draft-animal in operative relation thereto.

The steadying-frame 43 may be thrown over either side of the car-body by detaching the brace-rods 41 and reapplying them after reversal is made, and in this reverse movement or adjustment a great advantage resides in view of the fact that the road-bed or path may be located more conveniently at opposite sides of the track-rail in different localities. In some instances it may be necessary to lay the track-rail close to an embankment or steep grade, and in such event it is obvious that the steadying-frame would have to be arranged on the outer side of the car-body or that side farthest from the said embankment or grade. Hence the provision for reversing the steadying-frame will adapt the improved car to this contingency and render it capable of general use without requiring a special arrangement of the track-rails to accommodate the car structure. This capability of adjustment or reversal can be pursued in both forms of the car shown, and in addition to the movable attachment of the steadying-frame, as well as the adjustment of the arms to raise and lower said frame, equips the improved car with means for meeting various contingencies and conditions. The adjustment of the car-body or containing-receptacle in the manner set forth is also an essential feature of the present construction, as the load can be more nearly balanced in relation to the draft devices, the latter under such adjustment conjunctively operating by their capability of adjustment to render the balancing of the same more effective.

In the operation of the car it will be understood that it will be propelled in opposite directions over the single track-rail and the latter will be held down on the ground surface by any of the well-known or approved means.

Having thus fully described the invention, what is claimed as new is—

1. The combination with supporting means having longitudinally-disposed wheels adapted for a single track-rail, of a car-body pivotally mounted at one end and laterally movable at the opposite end over the said means, and draft devices located to one side of the body.

2. The combination with supporting means having longitudinally-disposed wheels adapted for a single track, of a car-body pivotally connected to the said means at one end and laterally movable over the latter, and reversible draft devices normally located to one side of the body.

3. The combination with a truck or frame having longitudinally-disposed wheels adapted for a single track, of a car-body mounted on said truck or frame, and vertically-adjustable draft devices normally located to one side of the body.

4. The combination with a truck or frame having longitudinally-disposed wheels adapted for a single track, of a car-body mounted and laterally movable on said truck or frame, and draft devices having an adjustable attachment and located to one side of the body, said draft devices including a steadying-frame which is movably attached.

5. A car of the class set forth having a vertically-adjustable draft device normally projected outwardly beyond one part of the body of the car and capable of being reversed to throw the same beyond either side of the car.

6. A car of the class set forth having vertically-adjustable draft devices including a movably-mounted steadying-frame, the said draft devices being normally located to one side of the body of the car.

7. In rolling-stock adapted for a single track-rail, the combination of a supporting means, and a body pivotally mounted at one end thereon and having adjusting means at the opposite ends.

8. In rolling-stock adapted for a single rail, the combination with a body, of pivotally-mounted draft devices including a movably-attached steadying-frame, and means for maintaining the draft devices in adjusted position.

9. In rolling-stock adapted for a single rail, the combination with a body, of draft devices pivotally attached for vertical adjustment and also for reverse location on either side of the body.

10. In rolling-stock adapted for a single rail, the combination with a laterally-adjustable body, of pivotally-mounted draft devices including a movably-attached steadying-frame.

11. In rolling-stock adapted for a single rail, the combination with a movably-mounted body, of pivotally-attached draft devices including a movably-attached steadying-frame, the said draft devices and frame being projectible beyond either side of the body.

In testimony whereof I affix my signature in presence of two witnesses.

JOHN ALEXANDER BURNS.

Witnesses:
DANL. M. NOONAN,
J. CAVANAGH.